MULTIVIBRATORS WITH PARTICULAR INPUT CIRCUITS

Filed Aug. 5, 1958 3 Sheets-Sheet 1

INVENTOR
RAY LORENZ

BY Cushman, Darby & Cushman
ATTORNEYS

INVENTOR
RAY LORENZ

BY Cushman, Darby & Cushman
ATTORNEYS

MULTIVIBRATORS WITH PARTICULAR INPUT CIRCUITS

Filed Aug. 5, 1958 3 Sheets-Sheet 3

INVENTOR
RAY LORENZ

BY Cushman, Darby & Cushman
ATTORNEYS

United States Patent Office 3,042,812
Patented July 3, 1962

3,042,812

MULTIVIBRATORS WITH PARTICULAR INPUT CIRCUITS

Ray Lorenz, Brooklyn Center, Minn., assignor to Sperry Rand Corporation, New York, N.Y., a corporation of Delaware Filed Aug. 5, 1958, Ser. No. 753,347
33 Claims. (Cl. 307—88.5)

This invention relates to improved multivibrator circuits and more specifically to input circuits therefor.

The ever-expanding utilization and increased complexity of electronic equipments has led to a determined effort to replace thermionic tubes with semi-conductive components such as transistors to take advantage of their low power consumption, small heat dissipation, sub-miniature size and higher reliability.

A basic component of digital electronic data processing systems is the flip-flop circuit or bistable multivibrator which is switched alternately between its two stable limiting conditions by means of electrical trigger pulses. If the switching between the two stable limiting conditions is accomplished by a single trigger pulse on a single input line, the flip-flop becomes a scale-of-two counter which can be used as a single stage in a binary counter or as a digit position in a binary counting or arithmetic register. Thus such a circuit is a basic building block for such items as a binary-coded decade counter, accumulating arithmetic register and the like.

Heretofore these has been considerable effort placed in attempting to provide a transistor flip-flop circuit which can be reliably triggered at relatively high repetitive rates by single input trigger pulses on a single toggle input line. Several of these attempts are pulse-width sensitive in that if the single input trigger pulse is too wide, the bistable circuit will oscillate between the two limiting conditions during the single input trigger. When the trigger is removed, it is a matter of speculation in which of the two limiting conditions the flip-flop will be. This requires that the input trigger pulse be closely controlled as to width or the trigger circuits will not reliably perform as a counting device.

It is well known that, during periods approaching current saturation, semi-conductive materials are prone to store minority carriers. When the junctions are so saturated the stored minority carriers cause a continuation of the current through the semi-conductor even after the voltage biasing of the semi-conductive junction is reversed. This phenomenon appears as an extension of the trailing edge of the output current waveform.

When transistors are used as the active elements in flip-flops and are operated at current saturation and current cutoff for limiting conditions, the minority carrier storage through the current saturated collector may cause a trailing edge on one output voltage of the flip-flop when the circuit is switched between the two limiting conditions. This phenomenon may interfere with recurrent switching when the flip-flop is switched by a single input trigger on a common input line leading to both base circuits of the flip-flop transistor elements. This invention minimizes the problem by providing a new input circuit which passes the trigger pulse to the base circuits without undue interference from the transient output voltages of the flip-flop.

According to this invention a multivibrator circuit is switched from one limiting condition to the other limiting condition by a single electrical impulse on an input line common to both inputs of the flip-flop; diode gating is combined with resistive-capacitive networks and diode clamping circuits to facilitate high-speed recurrent switching. This invention additionally minimizes the adverse affect of transients of the collector circuits of the flip-flop.

Accordingly, it is an object of this invention to provide an improved multivibrator circuit.

It is another object of this invention to provide an improved counting circuit of modulo two.

It is still another object of this invention to provide an improved input circuit for a bistable element.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figures 1, 5:
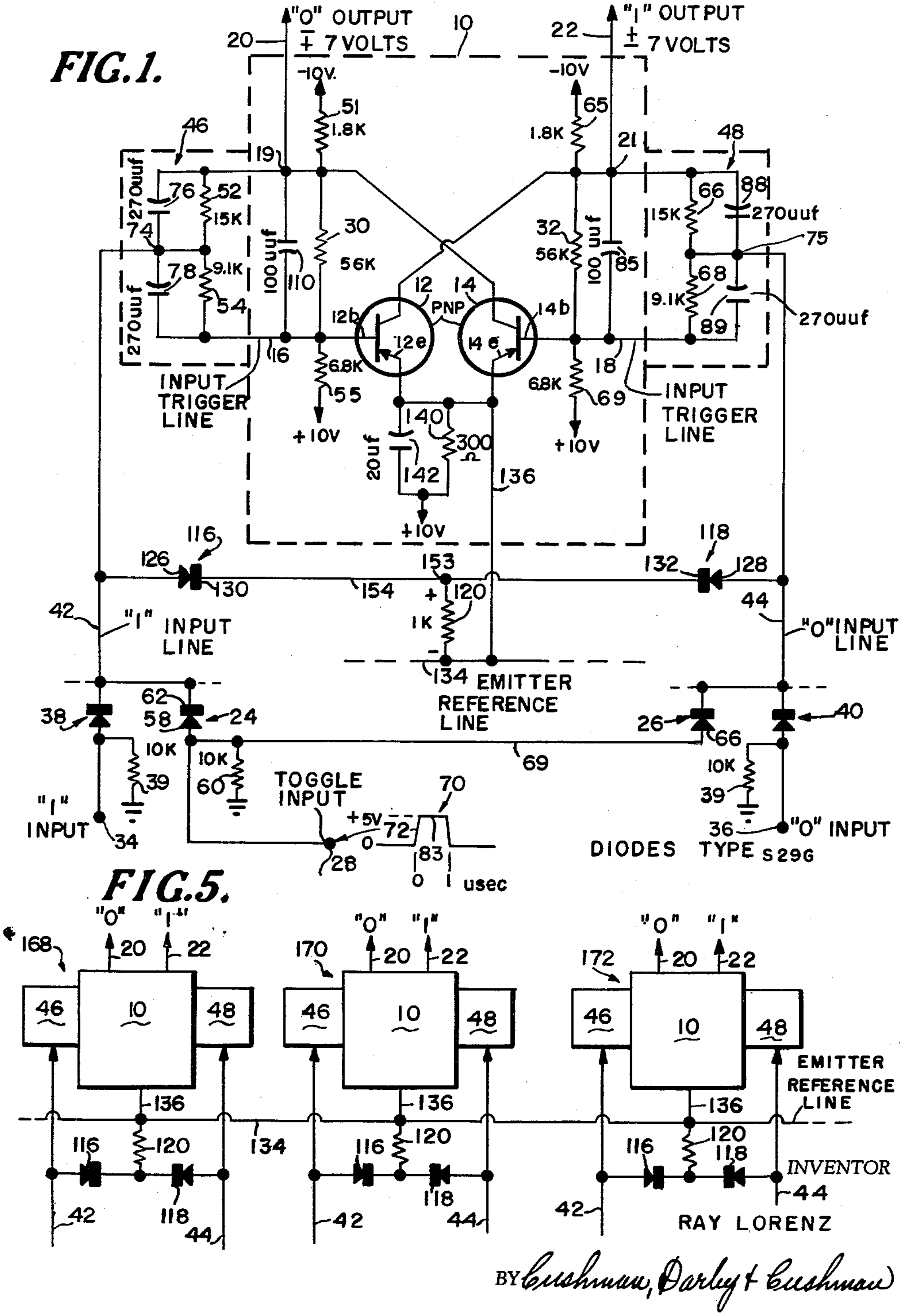
FIGURE 1 illustrates an exemplarly embodiment of this invention.
FIGURE 5 illustrates a plurality of the circuits of FIGURE 1 with the emitters thereof interconnected in the preferred manner.

The preferred embodiment of this invention is illustrated in FIGURE 1 wherein rectangular dashed box 10 contains the schematic of a conventional cathode-coupled bistable multivibrator. The operation of such a bistable circuit is explained in "Recurrent Electrical Transients," Von Tersch and Swago, Prentice-Hall, Inc., New York, 1953, beginning on page 280 and with reference to FIGURES 8–16 and 8–19. To switch the conduction from one active element, such as a transistor or vacuum triode, to the other, for example from transistor 12 to transistor 14, a positive single input trigger pulse may be applied to both input trigger lines 16 and 18. Conduction will switch from the conducting transistor to the non-conducting transistor as explained in the above reference. Improved switching action may be accomplished by routing the single input trigger pulse to only one of the input trigger lines 16 or 18 by gating said pulse to only one of said lines with the voltage present at junctions 19 and 21, i.e., on output lines 20 and 22, as hereinafter explained. When the voltage on line 20 is relatively positive, this means that transistor 14 is conducting; a positive input trigger (for the PNP type transistors shown) should be routed to the base **14*b* making transistor 14 non-conductive to initiate the switching action. It is apparent that a bistable multivibrator including NPN transistors would require a negative input trigger. With the voltages on output lines 20 and 22 fedback to input trigger lines 16 and 18 by resistors 30 and 32, respectively, diodes 24 and 26 may be used to provide the gating function. The cathodes of diodes 24 and 26 are conventionally connected directly to lines 16 and 18 or through serial resistors respectively. The toggle input trigger is applied to terminal 28 and thus to the anodes of both diodes 24 and 26 in the usual manner. When line 20 has thereon a relatively positive voltage, diode 24 will be reverse-biased, while line 22 which has a relatively negative voltage thereon causes diode 26 to be forward-biased at least during the application of a positive pulse to terminal 28. Thus the positive input trigger on terminal 28 will be blocked by diode 24 and passed by diode 26 to input trigger line 18. Similarly when output line 22 has thereon a relatively positive voltage and output line 20 has thereon a relatively negative voltage, diode 26 will be reverse biased and diode 24 will be forward biased at least when a positive pulse is applied to terminal 28, thus routing the input positive impulse on terminal 28 only to the input trigger line 16. As flip-flop 10 switches conduction from transistor 12 to transistor 14, the voltages on the output lines 20 and 22 also change thus modifying the biasing on diodes 24 and 26. It is apparent that if an input trigger pulse on terminal 28 is of such long duration that the voltages on the output lines 20 and 22 completely switch before the input positive pulse subsides or decays, the circuit will randomly reswitch conduction to transistor 12. Thus a conventional circuit, such as the one thus far described, is pulse-width sensitive if one desires only one switching action per input pulse. If the input pulse is longer than the time constant of the switching action of the circuit 10**, reliable toggling is impossible.

To switch flip-flop 10 unconditionally to one of the two limiting conditions or states, a positive electrical impulse is applied to terminal 34 to provide a positive voltage on output line 22 and to terminal 36 to provide a positive voltage on output line 20. Diodes 38 and 40 provide isolation of the inputs from other inputs which may be connected to input lines 42 and 44, respectively. The anodes of diodes 38 and 40 are preferably referenced to a potential such as ground by resistors 39 respectively.

In accordance with this invention, improved toggle operations, i.e. switching action initiated by application of a pulse to terminal 28, is obtained by adding at least a portion of input circuit 46 between the input line 42, trigger line 16 and junction 19, and by adding at least a portion of a similar input circuit 48 between input line 44, trigger line 18 and junction 21. The operation of circuit 46 only will be explained, as the operation of circuit 48 is identical thereto for similar voltage conditions.

Figures 2, 4:
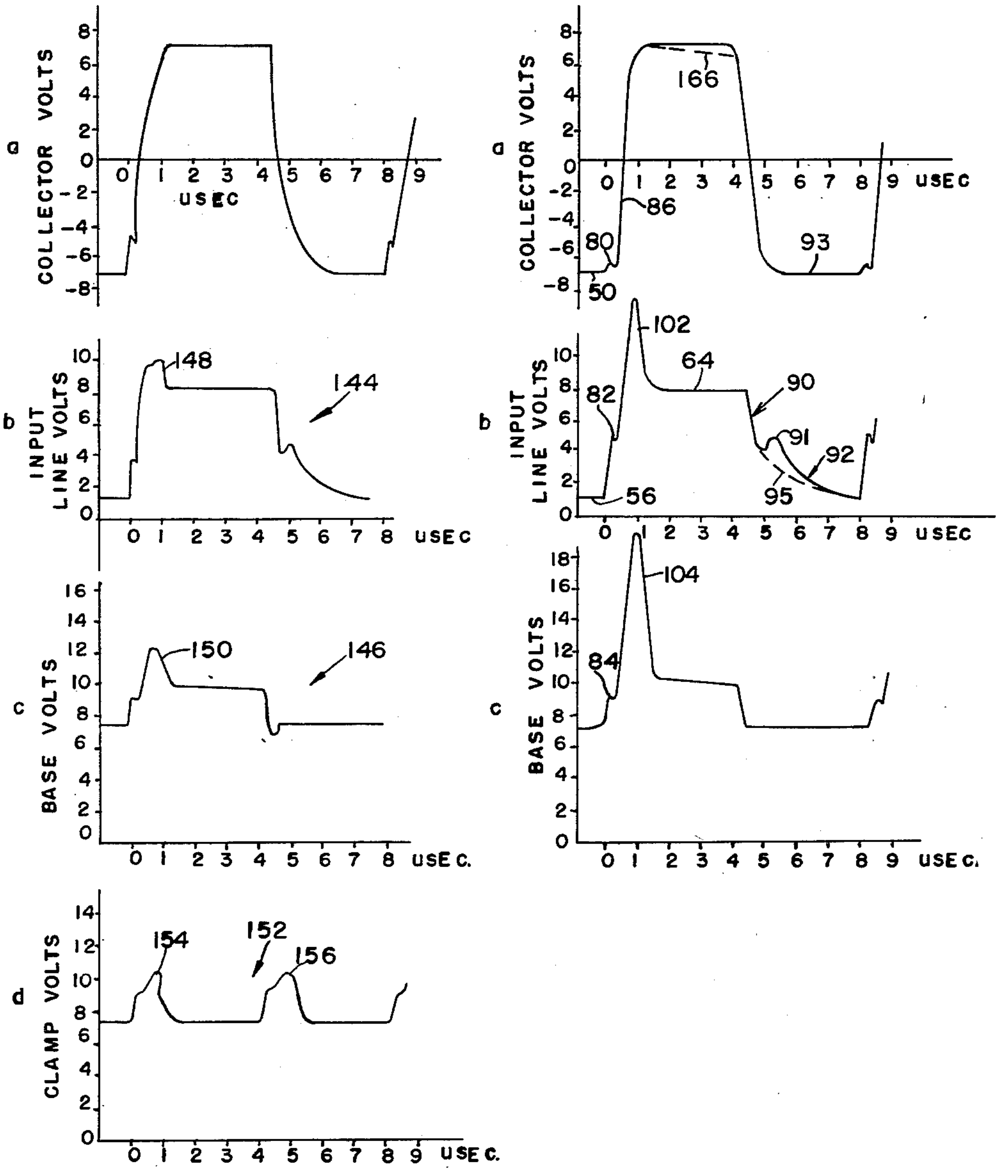
FIGURE 2 illustrates exemplary waveforms taken from the circuit of FIGURE 1 without the input clamping circuit, with one microsecond wide input pulses at 250 PRF.
FIGURE 4 illustrates exemplary waveforms taken from the circuit of FIGURE 1, with one microsecond wide input pulses at 250 PRF.

In explaining the operation of the circuit including flip-flop 10, input circuits 46 and 48 and input lines 42 and 44, reference may be had to the waveforms illustrated in FIGURE 2. In the following explanation transistor 12 is assumed to be initially conductive and transistor 14 is assumed to be initially non-conductive. In using one set of waveforms to explain the symmetrical circuit consisting of flip-flop 10 and input circuits 46 and 48, the leading edges of the waves in FIGURES 2*b* and 2*c* may be referred to the transistor 12 side of flip-flop 10 including circuit 46 and line 42 while the trailing edges may be referred to the transistor 14 side of flip-flop 10 including circuit 48 and line 44. The reverse is true of FIGURE 2*a*. That is, the leading edge of FIGURE 2*a* may be referred to transistor 14 while the trailing edge relates to transistor 12.

While transistor 12 conducting and transistor 14 non-conductive, a positive toggle input trigger to terminal 28 should be routed through diode 24 to input trigger line 16 to switch transistor 12 to the non-conductive state.

With transistor 14 non-conductive it is apparent that output line 20 has a relatively negative voltage thereon, for example minus seven volts as indicated in FIGURE 2*a* by numeral 50 on the graph entitled "Collector Volts."

This relatively negative voltage 50 is transferred at reduced amplitude, i.e. at a more positive amplitude, to line 42 through a voltage divider network including resistances 52 and 54 in circuit 46 to impose approximately a positive one volt reverse bias on diode 24 in view of the constant negative and positive 10 volt potentials applied via resistors 51 and 55 respectively to resistor 30 in parallel with resistors 52 and 54. This one-volt reverse bias is indicated in FIGURE 2*b* by numeral 56 on the graph entitled "Input Line Volts." Reverse biasing is accomplished by providing ground reference potential on the anode 58 of diode 24 by resistance 60 and the positive one-volt potential on line 42 connected to the cathode 62 of diode 24. It is obvious then that there is a negative one-volt difference from the potential on the cathode 62 to that on anode 58.

The reverse bias on diode 26 is approximately positive eight volts and similar to that indicated by numeral 64 in FIGURE 2*b*. Since line 20 is relatively negative, line 22 has a relatively positive voltage thereon, for example positive seven volts. This voltage per se is transferred at reduced amplitude (less positive value) to line 44 by virtue of the voltage dividing network including resistances 66 and 68, in the same manner as the negative voltage on line 20 is transferred to line 42 through the voltage divider including resistances 52 and 54, but appears on line 44 at a higher amplitude level in view of the constant negative and positive 10 volt potentials applied via resistors 65 and 69 respectively to resistor 32 in parallel with resistors 66 and 68. The voltage on anode 66 of diode 26 is the same as the voltage on anode 58 of diode 24 because the two anodes are tied together electrically by line 69. Thus diode 26 has a reverse bias of approximately eight volts.

At time 0 the voltages forming leading edge 72 of the five volt input pulse 70 (FIGURE 1) on terminal 28 are transferred through diode 24 over line 42 to junction 74 of circuit 46. Capacitors 76 and 78 transfer the high frequency components present in the fast rising edge 72 to output line 20 and trigger line 16 respectively. The effect of the leading edge 72 is manifested in the waveforms illustrated in FIGURE 2 as the ripples 80, 82 and 84 on the three voltage waves. Ripples 80 and 84 are due to the feed through of leading edge 72 via capacitors 76 and 78, respectively. After the initial surge due to the leading edge 72, the main body 82 of pulse 70 (FIGURE 1) provides approximately plus five volts on line 42 via diode 24 and a more positive voltage, approximately +9 volts, on line 16 through resistance 54. Once positive pulse 70 has so reached the base of transistor 12, said transistor begins to become less conductive thereby causing a negative-going transient on line 22 which is coupled to the base of non-conductive transistor 14 through capacitor 85. This negative transient causes transistor 14 to become more conductive which causes a positive-going transient on line 20 as indicated by numeral 86 in FIGURE 2*a* on the "Collector Volts" graph. It is apparent that the switching action will continue and be accumulative as is well known for the conventional Eccles-Jordan circuit.

During the switching action capacitor 88 of circuit 48 will transfer the above-mentioned negative-going transient on line 22 to line 44, as well as capacitor 76 of circuit 46 will transfer the above-mentioned positive-going transient on line 20 to line 42. The effect on the line 44 voltage on the negative transient on line 22 is similar to that indicated by numeral 90 in FIGURE 2*b*. The voltage on line 44 falls rapidly for about a full microsecond (the fall at least during the latter portion of such time being especially due to the low impedance of capacitor 88 to such negative transients) from about positive eight volts to about positive four volts; thereafter there is a three microsecond decay 92 which is generally exponential to about positive one volt. When the circuit is being repeatedly toggled, decay 92 does not reduce completely to one volt. As shown in FIGURE 2*b*, decay 92 includes "hump" 91 which goes to only +5 volts as a result of feed-through of the toggling pulse 70 (FIGURE 1). Dotted line 95 in FIGURE 2*b* indicates the decay characteristic when the circuit is not toggled but is unconditionally set as by a pulse to input terminal 34. Exponential decay 92 is caused by the relatively negative voltage as indicated in the collector voltage of transistor 12 by numeral 93 in FIGURE 2*a* on line 22 charging capacitor 88 until steady-state conditions are reached. The effect of the positive transient on line 20 being transferred to the input at junction 74 (line 42) by a reactive impedance such as capacitor 76, is to reinforce the positive input trigger 70 and cause voltage spike 102 in FIGURE 2*b*, thus aiding the switching. In a similar manner, the positive transient on line 20 is also transferred via capacitor 110 directly to the base input line 16 to cause voltage spike 104 in FIGURE 2*c* on the base of transistor 12, thus reinforcing the positive input trigger 70 and assisting the switching action. However, condenser 78 aids in passing the positive input pulse to the base of transistor 12 to a greater extent than the feedback condenser 110 transmits the change in collector voltage. The negative-going transients occurring on line 22 during the switching action and coupled to input line 44 via condenser 88 are clamped at junction 75 by diode 40, so that little if any negative collector voltage change is fed to base 14*b* through condensers 88 and 89. It may be noted that the coupling of the collector voltage change of one transistor to the base of the other transistor is substantially independent of the input pulse. The embodiment thus far described provides satisfactory operation at least up to about 250 kc. pulse repetitive frequency.

Figure 3:
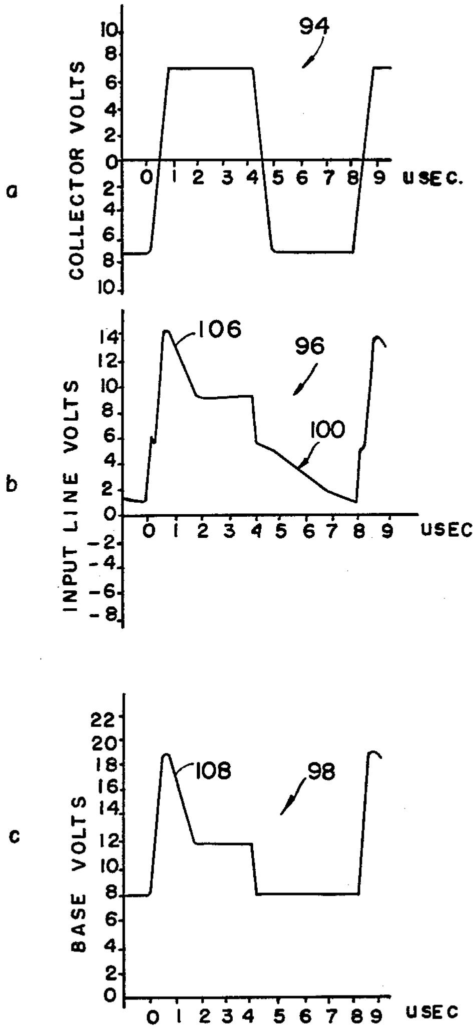
FIGURE 3 illustrates waveforms taken from the circuit of FIGURE 1 without capacity coupling between the collector and input circuits and without the diode clamp circuit, with one microsecond wide input pulses at 250 PRF.

For slower operation, for example, at pulse repetitive frequencies up to around 150 kc., capacitors 76 and 88 in circuits 46 and 48, respectively, may be removed. The effect of removing these capacitors is to increase the time constant on the input lines 42 and 44. Waveforms taken at 250 kc. pulse repetitive frequencies of the circuit hereinabove described but without condensers 76 and 88, were noted as illustrated in FIGURE 3 for the collector or output voltages (wave 94), input line voltages (wave 96), and base voltages (wave 98). The significant difference between the two sets of waveforms because of the increased time constant on line 44 is that the exponential decay 92 of FIGURE 2*b* becomes a non-exponential decay 100 (FIGURE 3*b*) which starts at a higher voltage (about six volts) and is consequently earlier starting but takes longer (about four instead of three microseconds) to decay to plus one volt. This longer decay time limits the upper repetitive rates of the toggling action.

It may be noted that the leading edge of the positive-going waveforms illustrated in FIGURES 2 and 3 have large positive spikes of voltages on the base and input line waveforms as indicated by numerals 102, 104, 106 and 108. These voltage spikes are caused aside from the input pulse by the aforementioned positive-going transient on the output line 20 being transferred by capacitor 76 to junction 74 and capacitor 110 to line 16 during switching of the current limiting condition from transistor 12 to transistor 14. Spikes 102 and 104 in FIGURE 2 are about two volts more positive than spikes 106 and 108 in FIGURE 3, the reduction being caused by the removal of capacitor 76 from the circuit 46 in measuring the waveforms. These positive spikes cause increased voltage differences between base 12*b* and emitter 12*e* of transistor 12. It is well known in the art that transistors are limited in the voltages that can be imposed between their electrodes and that if the voltage limitation is exceeded, breakdown of the semi-conductor material results thereby making the transistor elements inoperative. Elimination of much of the above-mentioned voltage spikes and further improvements in switching operation may be had by adding to the input circuitry (as it includes or excludes either or both of condensers 76, 88) a voltage clamping system including, for example, back to back diodes 116, 118 and resistor 120, as now explained.

The anode 126 of diode 116 is connected to input line 42 while anode 128 of diode 118 is connected to input line 44. The cathode 130 of diode 116 and the cathode 132 of diode 118 are connected to one end of resistor 120, the other end of resistor 120 being connected to emitter reference line 134. The preferred usage of the emitter reference line 134 will be explained later.

Line 136 connects line 134 to both emitters 12*e* and 14*e*. As explained in the above-mentioned reference, the total current flowing into both emitters 12*e* and 14*e* from resistor 140 as connected to a constant emitter biasing source, say +10 volts, is a substantially constant current, as is the current in a flip-flop constructed with thermionic discharge devices rather than semi-conductive discharge devices. Thus resistance 140 which may have an ohmic value of about 300 ohms has a constant voltage thereacross. Capacitor 142 may be added to smooth or filter out the transients that occur in total emitter currents during transient conditions, i.e. during switching. Capacitor 142 is not necessary for operation of this circuit but it is preferred to provide capacitive filtering of the switching transients.

It is apparent from the preceding paragraph that the combination of resistance 140 and capacitor 142 provides a convenient voltage bias-supply because of the substantially constant total emitter current from the flip-flop transistors 12 and 14. For example, the voltage drop across resistance 140 may be three volts providing a bias of positive seven volts with repsect to ground. Thus any positive voltage appearing on either input line 42 or 44 greater than the voltage on resistance 140 with respect to ground will be clamped to the emitter voltage through resistance 120 and one of diodes 116 and 118, respectively. The positive spikes 102 and 104 of FIGURE 2 and 106 and 108 of FIGURE 3 are substantially removed by the above-mentioned clamping action. With reference now to FIGURE 4 which illustrates the waveforms of the circuit in FIGURE 1 as it includes capacitors 76, 88 and the diode clamping system just referred to, note that the leading edges of the positive-going input line and base voltage waveforms 144 and 146 in FIGURES 4*b* and 4*c* respectively, have because of the clamp circuit, only about positive two-volt spikes 148 and 150 thereon, respectively, instead of the large spikes heretofore described.

The action of the clamp circuit including diodes 116 and 118 and resistance 120 may be conveniently measured by observing the current flow through resistance 120. In FIGURE 4*d* waveform 152 illustrates a voltage measured positive at junction 153 with respect to ground reference potential. Assuming that emitter reference line 134 is held substantially at positive seven volts with respect to ground as heretofore explained, the portion of wave 152 more positive than positive seven volts is indicative of current flow through resistance 120 from junction 153 to line 134. It is apparent that such current is caused by the clamping action of diodes 116 and 118. Thus positive spikes 154 and 156 on wave 152 are a measure of the current amplitude in the above described clamp circuit.

It is apparent in the circuit illustrated in FIGURE 1 that the resistances 30 and 32 are in parallel circuit with respect to resistances in the input circuits 46 and 48, respectively. As such, all of said resistances form part of the voltage dividers on each side of multivibrator 10. In the circuit described so far, it is apparent that resistances 30 and 32 can be combined with resistances in the input circuits 46 and 48, respectively, by lowering the impedances in the said input circuits such as has been done in the circuit on page 33 of vol. EC–5 "Transactions of the IRE," September 1956, as therein described by Booth and Bothwell. If the impedances of the overall external resistance network including resistors 30, 51, 52, 54, 55 and of the similar network including resistors 32, 65, 66, 68, and 69 are kept too high ,the output voltages on lines 20 and 22 will tend to droop as indicated by the dotted line 166 in the collector voltage sketch of FIGURE 2*a*.

By examining the voltage waveforms in FIGURE 4*c*, it is apparent that the clamping action heretofore described limits the positive peaks of the voltages on input lines 42 and 44 and thus on the trigger or base lines 16 and 18. As the voltages on either line 42 or 44 becomes more positive than positive seven volts, the respective diode 116, 118 becomes forward-biased and current flows therethrough to junction 153 thence to emitter reference line 134 through resistance 120. This current flow tends to limit the positive-going voltage on the respective input line 42, 44. The apparent effect of the clamp circuit on the collector electrode waveforms is negligible.

It is preferred that the clamping circuit just described be included for high pulse repetitive frequencies. Using 1.25 microsecond wide pulses and the clamping circuit, the multivibrator of FIGURE 1 has been reliably toggled at 500 kc. PRF. Utilization of the emitter reference line 134 is now explained with reference to FIGURE 5. In FIGURE 5 there are illustrated three bistable counting circuits 168, 170, and 172, each consisting of a basic flip-flop circuit 10 (with or without either or both of resistors 30 and 32, as desired) and two input circuits 46 and 48 (with or without either or both of capacitors 76 and 88, as desired). The emitter electrodes of all three of said bistable counting circuits are interconnected by their respective clamp circuits by emitter reference line 134, thus all emitter electrodes in the bistable circuits 168, 170 and 172 are directly connected together. Line 136 on each of the three bistable circuits indicates the connection between line 134 and the emitter electrodes as indicated in detail in FIGURE 1. It is to be understood that additional bistable circuits may be added to emitter reference line 134 in the manner just described to provide a constant and equal clamp bias for all bistable counting circuits which have signal interconnections. Resistances 120 are connected between the emitter reference line and the clamp diodes 116 and 118, as indicated in FIGURE 1, for each of the improved bistable circuits 168, 170 and 172 and any such additional bistable circuits (not shown) having the emitter electrodes of the flip-flop transistors 12 and 14 of FIGURE 1 connected thereto. Thus there is provided a bistable counting circuit which provides a stable common clamp reference potential for all input circuits to all of said bistable counting circuits.

As previously indicated, a multivibrator embodying this invention is substantially not pulse-width sensitive. In fact, much latitude for input pulse widths is provided by this invention. Successive input pulses may vary, for example, from 0.75 to 1.50 microseconds without impairing the reliability of the switching operations.

While component values have been shown on the drawing and mentioned herein, it is to be understood that such values are not restrictive of the invention, but merely indicate usable values which may be varied considerably as desired. Preferably the values of condensers 76, 78, 88 and 89 are all equal as shown.

The invention has been described relative to a particular transistorized bistable flip-flop, but it is to be understood that the invention is applicable to any multivibrator circuit whether bistable or not, whether the active elements are transistors or tubes, or whether or not the active elements are emitter (or cathode) coupled or have more than three electrodes.

Thus it is apparent that there is provided by this invention systems in which the various objects and advantages herein set forth are successfully achieved.

Modifications of this invention now described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. In a multivibrator circuit having two operating states respectively indicatable by relatively high and relatively low voltages on first and second junctions and respectively initiated and attained by an input signal on one of two input lines, there being a first series resistor for serially coupling a first of said input lines to a first input of said circuit and a second series resistor for serially coupling the second input line to a second input of said circuit and including a third resistor for coupling said first input line to said first junction and a fourth resistor for coupling said second input line to said second junction, said first input line and said first and third resistors being connected at a common point and said second input line and second and fourth resistors being connected at another common point, the improvement comprising reactive impedance means paralleling at least one of said first and second series resistors.

2. A circuit as in claim 1 wherein said reactive impedance means includes first and second reactive impedances respectively paralleling said first and second series resistors.

3. A circuit as in claim 2 wherein said first and second reactive impedances are condensers respectively.

4. A circuit as in claim 3 wherein said condensers are of equal value.

5. A circuit as in claim 3 and further including third and fourth condensers respectively paralleling said third and fourth resistors.

6. A circuit as in claim 5 wherein said third and fourth condensers are of equal value.

7. A circuit as in claim 5 wherein said first, second, third and fourth condensers are all of equal value.

8. A circuit as in claim 1 and further including condenser means paralleling at least one of said third and fourth resistors.

9. In a multivibrator circuit having two operative states respectively indicatable by relatively high and relatively low voltages on first and second junctions and respectively initiated and attained by an input signal on one of two input lines, there being first and second active elements in said circuit, each element having at least three electrodes, the first electrode of the first element being coupled to said second junction and the first electrode of said second element being coupled to said first junction, the second electrodes of said elements being connected together and commonly biased a predetermined amount, and including a first sries resistor for serially coupling a first of said input lines to the third electrode of said first element, a second series resistor for serially coupling the second input line to the third electrode of said second element, a third resistor in parallel with said first resistor with respect to the first input line for coupling said first input line to said first junction, and a fourth resistor in parallel with said second resistor with respect to the second input line for coupling said second input line to said second junction, the improvement comprising a first condenser in parallel with said first resistor, and a second condenser in parallel with said second resistor.

10. A circuit as in claim 9 and further including clamping means interconnecting said input lines and the second electrodes.

11. A circuit as in claim 9 and further including means for receiving said input signal, means interconnecting the last mentioned means to each of said input lines for gating said input signal thereto alternately, and clamping means interconnecting said input lines and the second electrodes of said active elements.

12. A circuit as in claim 11 wherein the clamping means includes two diodes coupled back to back and respectively to said input lines and a resistor coupled between said diodes to each of said second electrodes.

13. A circuit as in claim 9 and further including a third condenser in parallel with said third resistor and a fourth condenser in parallel with said fourth resistor.

14. A circuit as in claim 13 and further including clamping means interconnecting said input lines and the second electrodes.

15. A circuit as in claim 13 and further including means for receiving said input signal, means interconnecting the last mentioned means to each of said input lines for gating said input signal thereto alternately, and clamping means interconnecting said input lines and the second electrode of said active elements.

16. A circuit as in claim 15 wherein the clamping means includes two diodes coupled back to back and respectively to said input lines and a resistor coupled between said diodes to each of said second electrodes.

17. A multivibrator circuit comprising first and second active elements each having at least three electrodes, first and second junctions, the first electrode of the second element being connected to said first junction and the first electrode of the first element being connected to said second junction, a first condenser intercoupling said first junction and the second electrode of said first element, a second condenser intercoupling said second junction and the second electrode of said second element, the third electrodes being coupled together, means commonly coupled to said third electrodes for biasing same a predetermined amount, first and second input lines, first and second resistors serially coupling said input lines respectively to the second electrodes of the first and second elements, third and fourth condensers respectively paralleling said first and second resistors, a third resistor coupling the first input line to the first junction, said first and third resistors being in series with each other and together in parallel with said first condenser with said first input line being connected to the connecting point between said first and third resistors, a fourth resistor coupling the second input line to the second junction, said second and fourth resistors being in series with each other and together in parallel with said second condenser with said second input line being connected to the connecting point between said second and fourth resistors, means for receiving toggling input signals, gating means referenced to a predetermined potential and coupled between the last mentioned means and said input lines for gating said toggling signals alternately thereto, means for receiving a first unconditional input signal, means referenced to said predetermined potential connected to the last mentioned means for unidirectionally coupling said unconditional input signal to the first input line, means for receiving a second unconditional input signal, and means referenced to said predetermined potential and connected to the last mentioned means for unidirectionally coupling the second unconditional input signal to the second input line.

18. A multivibrator circuit as in claim 17 and further including a fifth condenser paralleling said third resistor and a sixth condenser paralleling said fourth resistor.

19. A multivibrator circuit as in claim 17 wherein the biasing means coupled to said third electrode includes resistive means, and further including a further condenser paralleling said resistive means.

20. A multivibrator circuit as in claim 17 and further including clamping means interconnecting said first and second input lines and the commonly coupled third electrodes of said active elements.

21. A multivibrator circuit as in claim 20 wherein said clamping means includes two diodes coupled back to back and respectively to said input lines and a resistor coupled between said diodes to said third electrodes.

22. A multivibrator circuit as in claim 17 wherein each of said active elements is a transistor.

23. A multivibrator circuit as in claim 22 wherein said first, second, and third electrodes of each transistor are respectively collector, base, and emitter electrodes.

24. A multivibrator circuit as in claim 22 wherein each of said transistors is of the PNP type.

25. A multivibrator as in claim 17 including resistive means paralleling said first condenser and other resistive means paralleling said second condenser.

26. A plurality of multivibrator circuits each having two input lines, active element means coupled at two inputs respectively to said input lines, a potential reference line coupled to said element means, and clamping means for each multivibrator circuit D.C. coupled between the two input lines and the potential reference line thereof for preventing the amplitude of any input signal on the so-coupled input lines from substantially exceeding the potential on said reference line; and a line intercoupling each of the potential reference lines of the different multivibrator circuits for providing a common potential reference for each of said circuits.

27. A plurality of multivibrator circuits as in claim 26 wherein each of the input lines for each of the different circuits is serially coupled to the respective inputs of the active element means by a parallel resistive-capacitive network.

28. A plurality of multivibrator circuits as in claim 27 wherein each of the different circuits includes first and second output junctions, and further includes a third resistive-capacitive network serially coupling the first of said input lines to said first junction, and a fourth resistive-capacitive network serially coupling the second input line to said second junction.

29. A plurality of multivibrator circuits as in claim 26 wherein each of said circuits includes first and second output junctions, a first parallel resistive-capacitive network coupling the first input line to the first of said inputs of the element means, a second parallel resistive-capacitive network coupling the second input line to the second of the inputs of said element means, a third parallel resistive-capacitive network coupling the first input to the first junction, and a fourth parallel resistive-capacitive network coupling the second input line to said second junction.

30. A plurality of multivibrator circuits as in claim 26 wherein each circuit includes means for receiving toggling input signals and gating means referenced to a predetermined potential and interconnecting the last mentioned means to the input lines of the respective circuit for gating the toggling signals alternately thereto.

31. A circuit as in claim 30 and further including respective means for receiving first and second unconditional input signals, means referenced to said predetermined potential and coupling the first unconditional input signal receiving means to the first input line, and means referenced to said predetermined potential and intercoupling the second unconditional input signal receiving means to the second input line.

32. A plurality of multivibrator circuits each having two input lines, active element means coupled at two inputs respectively to said input lines, a potential reference line coupled to said element means, clamping means for each multivibrator circuit interconnecting the two input lines and the potential reference line thereof, and a line intercoupling each of the potential reference lines of the different multivibrator circuits for providing a common potential reference for each of said circuits, wherein each of said circuits includes first and second junctions, a first parallel resistive-capacitive network coupling the first input line to the first of said inputs of the element means, a second parallel resistive-capacitive network coupling the second input line to the second of the inputs of said element means, a third parallel resistive-capacitive network coupling the first input to the first junction, and a fourth parallel resistive-capacitive network coupling the second input line to said second junction.

33. A plurality of multivibrator circuits each having two input lines, active element means coupled at two inputs respectively to said input lines and having reference electrode means, a D.C. potential source, resistor means coupling said source to said reference electrode means, said active element means being operable to cause a substantially constant current to flow through said resistor means to provide a substantially constant D.C. potential across said resistor means despite any switching action occurring in the respective multivibrator circuit, and means referenced to said constant D.C. potential and connected to the two input lines of the respective said circuit for limiting the maximum magnitude of any input signal on those lines substantially to said constant D.C. potential; and a line connecting together the reference electrode means of all said circuits to provide said constant potential as a common reference potential for each of said circuits.

References Cited in the file of this patent

UNITED STATES PATENTS

| | | |
|---|---|---|
| 2,506,439 | Bergfors | May 2, 1950 |
| 2,622,212 | Anderson et al. | Dec. 16, 1952 |
| 2,644,887 | Wolfe | July 7, 1953 |
| 2,825,805 | Ziffer | Mar. 4, 1958 |